United States Patent
Zhou et al.

(10) Patent No.: US 12,334,827 B2
(45) Date of Patent: Jun. 17, 2025

(54) TRANSIENT PERFORMANCE FOR APPARATUS WITH ELECTRICALLY COUPLED OUTPUT INDUCTORS

(71) Applicant: Infineon Technologies Austria AG, Villach (AT)

(72) Inventors: Yong Zhou, Providence, RI (US); Danny Clavette, Greene, RI (US); Stephen Roy Pullen, Olympia, WA (US)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 254 days.

(21) Appl. No.: 18/079,184

(22) Filed: Dec. 12, 2022

(65) Prior Publication Data
US 2024/0195305 A1    Jun. 13, 2024

(51) Int. Cl.
*H02M 3/158*    (2006.01)
*H02M 3/335*    (2006.01)

(52) U.S. Cl.
CPC ................. *H02M 3/1584* (2013.01)

(58) Field of Classification Search
CPC ........................ H02M 3/33573; H02M 3/1584
See application file for complete search history.

(56) References Cited

U.S. PATENT DOCUMENTS

| | | | | |
|---|---|---|---|---|
| 5,305,191 A | * | 4/1994 | Loftus, Jr. | ........... H02M 3/3376 |
| | | | | 327/108 |
| 8,743,575 B2 | * | 6/2014 | Nymand | ............... H02M 3/335 |
| | | | | 363/17 |
| 10,396,673 B1 | | 8/2019 | Presti et al. | |
| 2010/0026208 A1 | * | 2/2010 | Shteynberg | ........ H05B 45/3725 |
| | | | | 315/297 |

(Continued)

FOREIGN PATENT DOCUMENTS

| | | | | | |
|---|---|---|---|---|---|
| DE | 102014116371 A1 | * | 5/2015 | ........ | H02M 3/33592 |
| KR | 101464478 B1 | * | 11/2014 | | |
| KR | 101528465 B1 | * | 6/2015 | | |

OTHER PUBLICATIONS

"Fast multi-phase trans-inductor voltage regulator", Technical Disclosure Commons, (May 9, 2019) https://www.tdcommons.org/dpubs_series/2194.

(Continued)

*Primary Examiner* — Sisay G Tiku
(74) *Attorney, Agent, or Firm* — Cooper Legal Group LLC

(57) ABSTRACT

An apparatus is configured according to a transformer based step down topology is provided. The apparatus includes a first transformer that transfers energy from a primary side of the first transformer to a secondary side of the first transformer for driving a load at the secondary side. The apparatus includes a first inductor and a second inductor electrically coupled at the secondary side. The apparatus includes a primary side directional conducting element and a sec- (Continued)

ondary side directional conducting element configured to perform a first phase of transferring the energy through the first inductor and a second phase of transferring the energy through the second inductor. The first inductor induces the second inductor to transfer energy during the first phase and the second inductor induces the first inductor to transfer energy during the second phase.

20 Claims, 6 Drawing Sheets

(56) References Cited

U.S. PATENT DOCUMENTS

2012/0033452 A1 2/2012 Grover et al.
2024/0123848 A1* 4/2024 Da-Cunha-Alves ...... H02J 7/02

OTHER PUBLICATIONS

"Multiphase Buck Converter with TLVR Output Filter", Infineon Technologies AG, Munich Germany, (Dec. 2, 2021) Document reference AN_2011_PL12_2012_221647.
European Search Report from Corresponding European Patent Application No. 23215936.8, 13 pages.
Shi Lixin, et al., "A Wireless Power Transfer System With Inverse Coupled Current Doubler Rectifier for High-Output Current Application", IEEE Transactions on Industrial Electronics, IEEE Service Center, Piscataway, Nj, USA, vol. 69, No. 5, May 13, 2021, pp. 4607-4616, XP011897394.
RakeshBabu Panguloori, et al., "Inductor Coupling Scheme to Enhance the Dynamic Performance of a Half-Bridge DC-DC Converter", Tencon 2008 - 2008, Tencon 2008. IEEE Region 10 Conference, IEEE, Piscataway, Nj, USA, Nov. 19, 2008, pp. 1-6, XP031414506.

* cited by examiner

PHASE (2)

TRANSIENT PERFORMANCE FOR APPARATUS WITH ELECTRICALLY COUPLED OUTPUT INDUCTORS

TECHNICAL FIELD

The present disclosure relates to the field of transformer based step down topologies.

BACKGROUND

Many enterprise power applications and data centers utilize high performance computing apparatuses, such as central processing units (CPUs), graphics processing units (GPUs), application-specific integrated circuits (ASICs), and/or other types of devices. These high performance computing apparatuses have loads with fast transient current demands. The ability to achieve these fast transient current demands is bottlenecked by shallow current slew rates that affect the total output current to the loads. A shallow current slew rate can be caused by several multi-phase output inductor currents that do not influence each other.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, an apparatus configured according to a transformer based step down topology is provided. The apparatus includes a first transformer configured to transfer energy of an input source from a primary side of the first transformer to a secondary side of the first transformer for driving a load at the secondary side. The apparatus includes a first inductor and a second inductor electrically coupled at the secondary side. The apparatus includes a primary side directional conducting element and a secondary side directional conducting element configured to perform a first phase of transferring the energy through the first inductor and a second phase of transferring the energy through the second inductor. The first inductor induces the second inductor to transfer energy during the first phase and the second inductor induces the first inductor to transfer energy during the second phase.

In an embodiment of the techniques presented herein, a method of operating an apparatus having a transformer based step down topology is provided. The method includes initiating a first phase for transferring energy from a primary side of a transformer to a secondary side of the transformer for driving a load at the secondary side by turning on a first primary side switch and a second secondary side switch and turning off a second primary side switch and a first secondary side switch. The energy is transferred through a first inductor of the secondary side to the load. The first inductor induces a second inductor of the secondary side to transfer the energy during the first phase based upon an electrical coupling between the first inductor and the second inductor. A second phase is initiated for transferring the energy by turning off the first primary side switch and the second secondary side switch and turning on the second primary side switch and the first secondary side switch. The energy is transferred through the second inductor to the load. The second inductor induces the first inductor to transfer the energy during the second phase based upon the electrical coupling.

In an embodiment of the techniques presented herein, an apparatus is provided. The apparatus includes a means for initiating a first phase for transferring energy from a primary side of a transformer to a secondary side of the transformer for driving a load at the secondary side by turning on a first primary side switch and a second secondary side switch and turning off a second primary side switch and a first secondary side switch. The energy is transferred through a first inductor of the secondary side to the load. The first inductor induces a second inductor of the secondary side to transfer the energy during the first phase based upon an electrical coupling between the first inductor and the second inductor. The apparatus includes a means for initiating a second phase for transferring the energy by turning off the first primary side switch and the second secondary side switch and turning on the second primary side switch and the first secondary side switch. The energy is transferred through the second inductor to the load. The second inductor induces the first inductor to transfer the energy during the second phase based upon the electrical coupling In an embodiment of the techniques presented herein, an apparatus configured according to a transformer based step down topology is provided. The apparatus includes a plurality of phase cells. The plurality of phase cells includes a first phase cell. The first phase cell includes a first transformer configured to transfer energy from a primary side of the first transformer to a secondary side of the first transformer for driving a load at the secondary side. The first phase cell includes a first inductor and a second inductor electrically coupled at the secondary side. The first phase cell includes a primary side directional conducting element and a secondary side directional conducting element configured to perform a first phase of transferring the energy through the first inductor and a second phase of transferring the energy through the second inductor. The first inductor induces the second inductor to transfer energy during the first phase and the second inductor induces the first inductor to transfer energy during the second phase. The plurality of phase cells includes a second phase cell including a second transformer, a third inductor connected to the second inductor, and a fourth inductor connected to the third inductor.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1A:
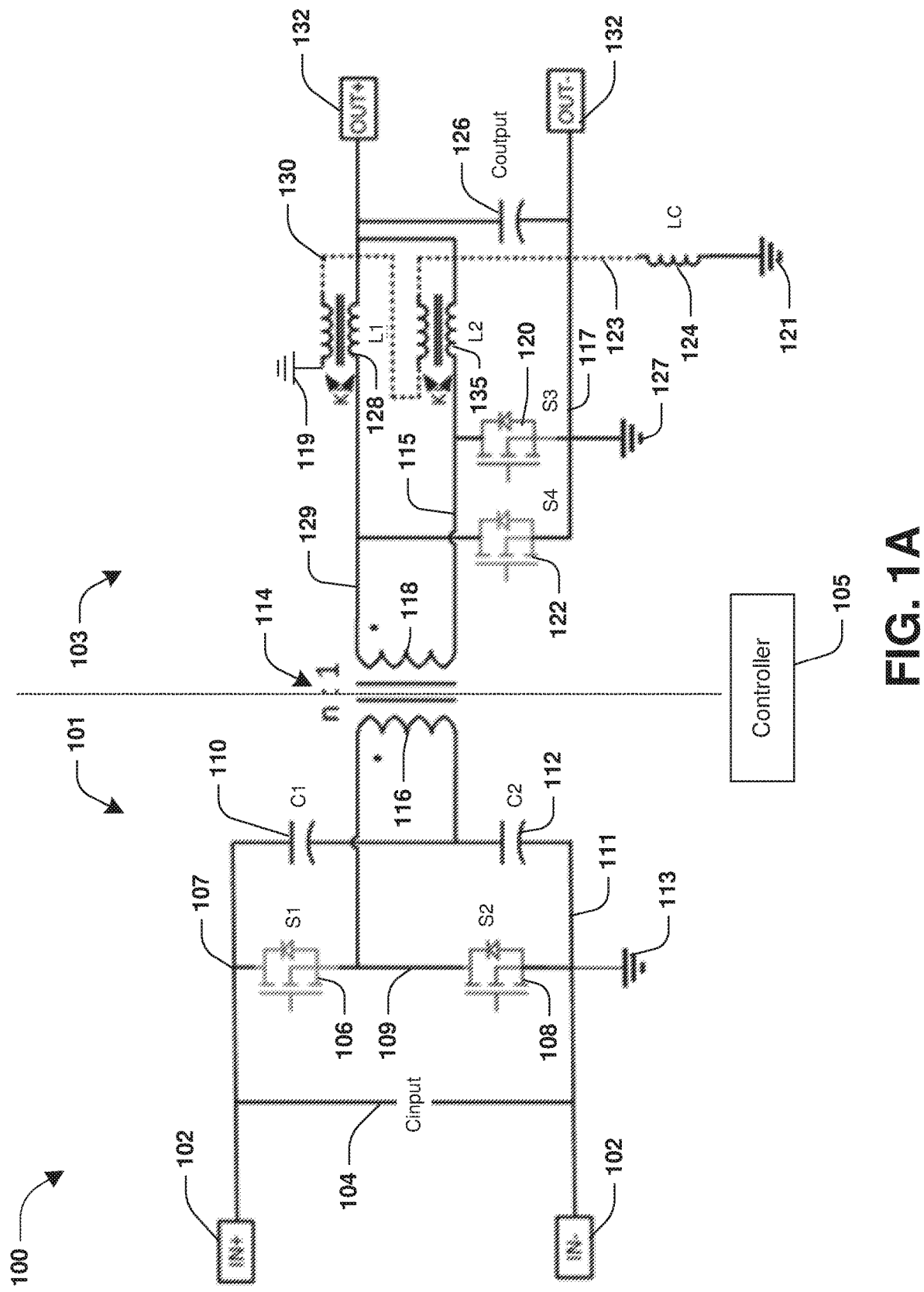
FIG. 1A is a component block diagram illustrating an apparatus configured according to a transformer based step down topology in accordance with at least some of the techniques presented herein.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

An electrically coupled output inductor configuration is provided for an apparatus configured according to a transformer based step down topology and/or apparatuses with other configurations. The electrically coupled output inductor configuration increases (e.g., boosts) a current slew rate (e.g., a change in current over time provided to a load) and improves transient performance of the apparatus for satisfying transient current demand of the load. The increased current slew rate and improved transient performance is achieved through the operation of electrically coupled output inductors used during multiple phases of energy transfer to the load.

The electrically coupled output inductor configuration can be implemented for current doublers, isolated power converters, and/or other apparatuses (e.g., devices associated with CPUs, GPUs, ASICs, etc.). The electrically coupled output inductor configuration boosts the current slew rate by replacing discrete inductors, which are not electrically coupled, with electrically coupled output inductors that have coupled transformers with secondary windings connected in series and are ground terminated on both ends. The electrically coupled output inductor configuration enables high output inductance along with a low switching frequency that results in high system efficiency. The electrically coupled output inductor configuration provides low effective transient inductance (e.g., during a switching event of a switch), which results in improve transient performance. In some embodiments, the electrically coupled output inductor configuration may be used for apparatuses having a half bridge configuration, a full bridge configuration, a two inductor and capacitor (LLC) configuration, a forward convert configuration, etc.

The electrically coupled output inductor configuration includes pairs of output inductors that are electrically coupled. Without the electrically coupled output inductor configuration, a pair of output inductors that are not electrically coupled will result in output inductor currents that do not ramp up together. This means that only one of the output inductor currents has a positive slew rate at any given point of time. This results in an even shallower current slew rate for a total output current, which is a bottleneck for satisfying fast transient load current demands for high performance computing devices such as CPUs, GPUs, ASICs, etc.

FIG. 1A is a component block diagram illustrating an apparatus 100 configured according to a transformer based step down topology in accordance with at least some of the techniques presented herein. The apparatus 100 includes a transformer 114. The transformer 114 has primary windings 116 and secondary windings 118. The transformer 114 is configured to transfer energy from a primary side 101 of the transformer 114 to a secondary side 103 of the transformer 114 based upon a winding ratio between the primary windings 116 and the secondary windings 118. The transformer 114 is configured to transfer energy of an input source 102 from the primary side 101 of the transformer 114 to the secondary side 103 of the transformer 114 for driving a load at the secondary side 103 (e.g., a load connected to an output 132 of the apparatus 100). In some embodiments, a 48V input is supplied to a top side the primary windings 116. There is 24V across the transformer 114, and there is 24V at a bottom side of the primary windings 116. If the winding ratio is 4:1, then the secondary side 103 of the transformer 114 will have 6V (e.g., 1V at the load connected to the output 132 of the apparatus 100 and 5V over a first inductor (L1) 128). In this way, the step down topology steps down the 24V to 6V (a step down of 4x), but results in a 4x increase in current at the secondary side 103 of the transformer 114.

In some embodiments, the apparatus 100 comprises a primary side capacitor (Cinput) 104 connected to the input source 102. In some embodiments, the apparatus 100 comprises a secondary side capacitor 126 connected to the load through the output 132. The apparatus 100 comprises the first inductor (L1) 128 and a second inductor (L2) 135. The first inductor (L1) 128 and the second inductor (L2) 135 are electrically coupled 130 at the secondary side 103 of the transformer 114. In some embodiments, a first end of the first inductor (L1) 128 (e.g., a first end of a secondary winding of the first inductor (L1) 128) is connected to ground 119 and a second end of the first inductor (L1) 128 (e.g., a second end of the secondary winding of the first inductor (L1) 128) is electrically coupled 130 to a first end of the second inductor (L2) 135 (e.g., a first end of a secondary winding of the second inductor (L2) 135). A second end of the second inductor (L2) 135 (e.g., a second end of the secondary winding of the second inductor (L2) 135) is electrically coupled 123 to ground 121. In some embodiments, the second end of the second inductor (L2) 135 is electrically coupled 123 to ground 121 through an LC terminating inductor (LC) 124. In some embodiments, the LC terminating inductor (LC) 124 is a physical component added to the apparatus 100. In some embodiments, instead of utilizing the LC terminating inductor (LC) 124, an embedded and distributed leakage inductance in an output transformer and printed circuit board (PCB) traces is used in place of a physical LC component.

In some embodiments, the first inductor (L1) 128 and/or the second inductor (L2) 135 are discrete inductors with a 1:1 winding ratio transformer (a tightly coupled transformer) where the secondary windings of the discrete inductors are connected in series. That is, secondary windings of the first inductor (L1) 128 are electrically coupled 130 to secondary windings of the second inductor (L2) 135. Primary windings of the first inductor (L1) 128 are connected between a top side of the secondary windings 118 of the transformer 114 and the output 132 (OUT+) of the apparatus 100. Primary windings of the second inductor (L2) 135 are connected between a bottom side of the secondary windings 118 of the transformer 114 and the output 132 (OUT+) of the apparatus 100.

In some embodiments, the apparatus 100 comprises a primary side capacitor component connected to the transformer 114. In some embodiments, the primary side capacitor component comprises a first capacitor (C1) 110. In some embodiments, the primary side capacitor component comprises a second capacitor (C2) 112. The first capacitor (C1) 110 is connected between the input source 102 (IN+) and the second capacitor (C2) 112. The first capacitor (C1) 110 is connected between the input source 102 (IN+) and the bottom side of the primary windings 116 of the transformer 114. The second capacitor (C2) 112 is connected between the input source 102 (IN−) and the first capacitor (C1) 110. The second capacitor (C2) 112 is connected between the input source 102 (IN−) and the bottom side of the primary windings 116 of the transformer 114.

In some embodiments, the apparatus 100 includes a controller 105 that may be connected to the primary side 101 and/or the secondary side 103 of the transformer 114. The controller 105 is configured to trigger a duty cycle increase for transferring the energy from the primary side 101 of the transformer 114, through the transformer 114, to the secondary side 103 of the transformer 114 to the load connected to the output 132. The controller 105 triggers the duty cycle increase based upon detecting a load transient.

In some embodiments, the apparatus 100 includes a primary side directional conducting element. The primary side directional conducting element may comprise a first switch (S1) 106 located at the primary side 101 of the transformer 114. The primary side directional conducting element may comprise a second switch (S2) 108 located at the primary side 101 of the transformer 114. The first switch (S1) 106 is connected to a first node 107 that is connected to the input source 102 (IN+), the first capacitor (C1) 110, and/or the primary side capacitor (Cinput) 104. The first switch (S1) 106 is connected to a second node 109 that is connected to the second switch (S2) 108 and/or the top side of the primary windings 116 of the transformer 114. The second switch (S2) 108 is connected to a third node 111 that is connected to the input source 102 (IN−), ground 113, the primary side capacitor (Cinput) 104, and/or the second capacitor (C2) 112.

In some embodiments, the apparatus 100 includes a secondary side directional conducting element. The secondary side directional conducting element may comprise a third switch (S3) 120 located at the secondary side 103 of the transformer 114. The secondary side directional conducting element may comprises a fourth switch (S4) 122 located at the secondary side 103 of the transformer 114. The third switch (S3) 120 is connected to a fourth node 115 that is connected to the bottom side of the secondary windings 118 of the transformer 114 and/or primary windings of the second inductor (L2) 135. The third switch (S3) 120 is connected to a fifth node 117 that is connected to ground 127, the fourth switch (S4) 122, the secondary side capacitor 126, and/or the output 132 (OUT−). The fourth switch (S4) 122 is connected to a sixth node 129 that is connected to the top side of the secondary windings 118 of the transformer 114 and/or primary windings of the first inductor (L1) 128. The fourth switch (S4) 122 is connected to the fifth node 117 that is connected to ground 127, the third switch (S3) 120, the secondary side capacitor 126, and/or the output 132 (OUT−).

The primary side directional conducting element and/or the secondary side directional conducting element are configured to perform one or more phases of transferring energy from the primary side 101 of the transformer 114, through the transformer 114 to the secondary side 103 of the transformer 114, and through the first inductor (L1) 128 and/or the second inductor (L2) 135 to the load connected to the output 132.

Figure 1B:
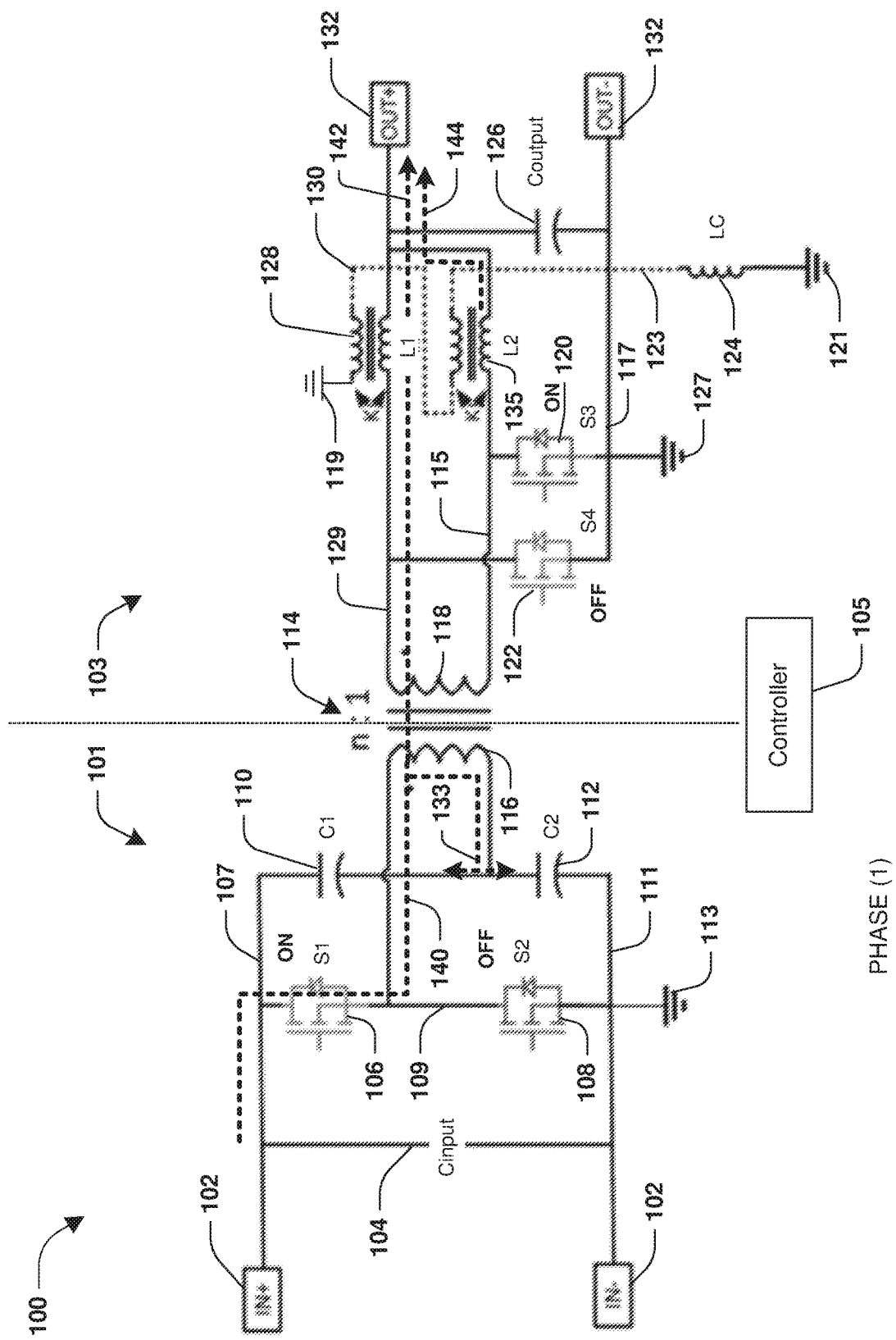
FIG. 1B is a component block diagram illustrating an apparatus configured according to a transformer based step down topology where a first phase of energy transfer is performed in accordance with at least some of the techniques presented herein.

FIG. 1B is a component block diagram illustrating the apparatus 100 configured according to the transformer based step down topology where a first phase of energy transfer is performed. During the first phase of transferring energy, the energy (e.g., current 140) is transferred through the first inductor (L1) 128. In some embodiments, the energy is transferred as current 140 through the first switch (S1) 106, into the top side of the primary windings 116 of the transformer 114 to the secondary windings 118 of the transformer 114, and through the primary windings of the first inductor 128 as a first output current 142 to the load connected to the output 132. The current 140 flows in this direction from the input source 102 through the first switch (S1) 106 to the primary windings 116 of the transformer 114 because the first switch (S1) 106 is turned on and the second switch (S2) 108 is turned off. The current 140 flows through the primary windings of the first inductor 128 as the first output current 142 to the load because the third switch (S3) 120 is on and the fourth switch (S4) 122 is off. During the first phase, the primary side capacitor component is charged. In particular, the first capacitor (C1) 110 and/or the second capacitor (C2) 112 of the primary side capacitor component are charged during the first phase. The energy (e.g., current 140) flows from the top side of the primary windings 116 of the transformer 114 to the bottom side of the primary windings 116 of the transformer 114 as current 133 that charges the first capacitor (C1) 110 and/or the second capacitor (C2) 112 of the primary side capacitor component.

In some embodiments, the first inductor (L1) 128 and the second inductor (L2) 135 transfer energy to the load (e.g., towards the output 132 (OUT+)) during the first phase. In particular, the first inductor (L1) 128 transfers energy through the primary windings of the first inductor (L1) 128 as the first output current 142 towards the load. The second inductor (L2) 135 transfers energy through the primary windings of the second inductor (L2) 135 as a second output current 144 towards the load. The second output current 144 is a result of the first inductor (L1) 128 and the second inductor (L2) 135 being electrically coupled. That is, the secondary windings of the first inductor (L1) 128 are electrically coupled to the secondary windings of the second inductor (L2) 135. Energy from the current 140 flowing through the primary windings of the first inductor (L1) 128 is transferred through the secondary windings of the first inductor (L1) 128 and through the electrical coupling 130 to the secondary windings of the second inductor (L2) 135, which flows as the second output current 144 from the primary windings of the second inductor (L2) 135 to the load. Thus, the first inductor (L1) 128 induces the second output current 144 to flow through the second inductor (L2) 135. In some embodiments, the first inductor (L1) 128 induces the second inductor (L2) 135 to transfer energy even though the second inductor (L2) 135 may be off. In this way, the induced second output current 144 from the second inductor (L2) 135 and the first output current 142 from the first inductor (L1) 128 flow towards the output 132 (OUT+) to the load.

Figure 1C:
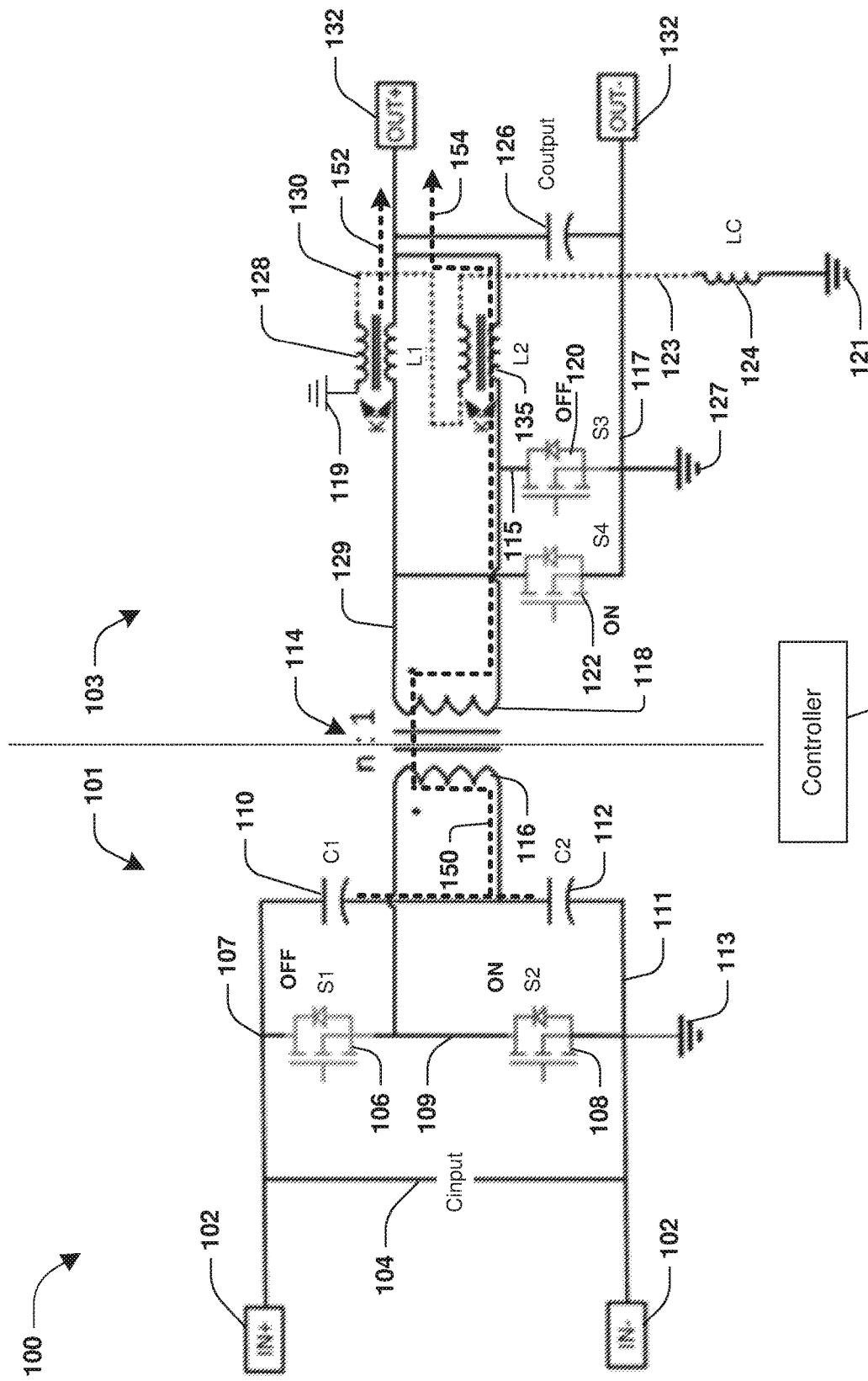
FIG. 1C is a component block diagram illustrating an apparatus configured according to a transformer based step down topology where a second phase of energy transfer is performed in accordance with at least some of the techniques presented herein.

FIG. 1C is a component block diagram illustrating the apparatus 100 configured according to the transformer based step down topology where a second phase of energy transfer is performed. During the second phase of transferring energy, energy (e.g., current 150) is transferred through the second inductor (L2) 135. In some embodiments, the energy is transferred as current 150 from the primary side capacitor component (e.g., stored energy within the first capacitor (C1) 110 and the second capacitor (C2) 112 that was stored during the first phase) into the top side of the primary windings 116 of the transformer 114 to the secondary windings 118 of the transformer 114, and through the primary windings of the second inductor (L2) 130 as a third output current 154 to the load connected to the output 132. The current 150 flows in this direction from the primary side capacitor component (e.g., the first capacitor (C1) 110 and the second capacitor (C2) 112) to the second inductor (L2) 135 because the first switch (S1) 106 is turned off, the second switch (S2) 108 is turned on, the third switch (S3) 120 is turned off, and the fourth switch (S4) 122 is turned on.

In some embodiments, the first inductor (L1) 128 and the second inductor (L2) 135 transfer energy to the load (e.g., towards the output 132 (OUT+)) during the second phase. In particular, the second inductor (L2) 135 transfers energy through the primary windings of the second inductor (L2) 135 as the third output current 154 towards the load. The first inductor (L1) 128 transfers energy through the primary windings of the first inductor (L1) 128 as fourth output current 152 towards the load. The fourth output current 152 is a result of the first inductor (L1) 128 and the second inductor (L2) 135 being electrically coupled. That is, the secondary windings of the first inductor (L1) 128 are electrically coupled to the secondary windings of the second inductor (L2) 135. Energy from the current 150 flowing through the primary windings of the second inductor (L2) 135 is transferred through the secondary windings of the second inductor (L2) 135 through the electrical coupling 130 to the secondary windings of the first inductor (L1) 128, which flows as the fourth output current 152 from the primary windings of the first inductor (L1) 128 to the load. Thus, the second inductor (L2) 135 induces the fourth output current 152 to flow through the first inductor (L1) 128. In some embodiments, the second inductor (L2) 135 induces the first inductor (L1) 128 to transfer energy even though the first inductor (L1) 128 may be off. In this way, the third output current 154 from the second inductor (L2) 135 and the induced fourth output current 152 from the first inductor (L1) 128 flow towards the output 132 (OUT+) to the load.

Because energy is being transferred through the electrically coupled inductors (e.g., inductor (L1) 128 and inductor (L2) 135) of the apparatus 100 during the first phase and the second phase, a high output inductance is achieved, along with a low switching frequency. This results in high system efficiency of the apparatus 100. Additionally, the effective transient inductance is low, which results in high transient performance of the apparatus 100.

In some embodiments, the apparatus 100 is a single phase cell. In some embodiments, the apparatus 100 is a phase cell that may be connected to one or more other phase cells. In some embodiments, the apparatus 100 is one phase cell out of a plurality of phase cells that are electrically coupled together. The plurality of phase cells may include any number of phase cells that are electrically coupled together.

Figure 2:
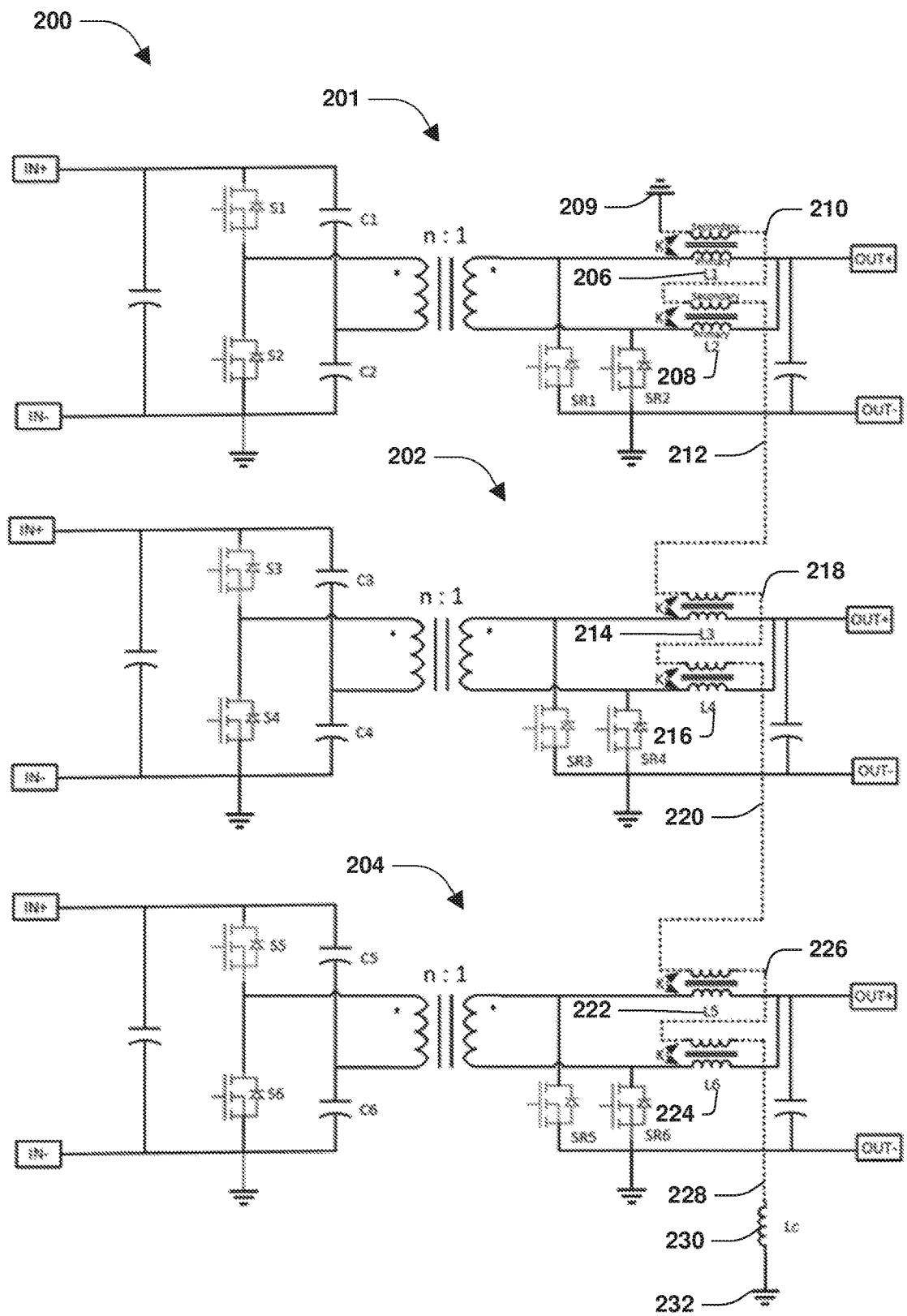
FIG. 2 is a component block diagram illustrating an apparatus having multiple phase cells in accordance with at least some of the techniques presented herein.

FIG. 2 is a component block diagram illustrating an apparatus 200 comprising multiple phase cells. It may be appreciated that the apparatus 200 may comprise any number of phase cells, and that the apparatus 200 is illustrated with 3 phase cells as merely one embodiment. Each phase cell may operate in a similar manner as the phase cell (apparatus 100) described in relation to FIGS. 1A-1C. The apparatus 200 comprises a first phase cell 201. The first phase cell 201 comprises a first inductor (L1) 206 and a second inductor (L2) 208. A secondary winding of the first inductor (L1) 206 and a secondary winding of the second inductor (L2) 208 are electrically coupled 210 together. The secondary winding of the first inductor (L1) 206 may be connected to ground 209. During one or more phases of energy transfer from a primary side of a transformer of the first phase cell 201 to a secondary side of the transformer of the first phase cell 201, current may flow through a primary winding of the first inductor (L1) 206 and/or current may flow through a primary winding of the second inductor (L2) 208 to a load connected to an output of the first phase cell 201. Depending on the phase, one of the currents may be from either an input source at the primary side of the transformer (e.g., during a first phase) or from stored energy of a primary side capacitor component (e.g., a capacitor (C1) and/or a capacitor (C2)) at the primary side of the transformer (e.g., during a second phase), while the other current may be an induced current due to the first inductor (L1) 206 and the second inductor (L2) 208 being electrically coupled together.

The apparatus 200 comprises a second phase cell 202. The second phase cell 202 comprises a third inductor (L3) 214 and a fourth inductor (L4) 216. A secondary winding of the third inductor (L3) 214 and a secondary winding of the fourth inductor (L4) 216 are electrically coupled 218 together. The second phase cell 202 and the first phase cell 201 may be electrically coupled 212 together. In particular, the secondary winding of the second inductor (L2) 208 of the first phase cell 201 is electrically coupled 212 to the secondary winding of the third inductor (L3) 214 of the second phase cell 202.

During one or more phases of energy transfer from a primary side of a transformer of the second phase cell 202 to a secondary side of the transformer of the second phase cell 202, current may flow through a primary winding of the third inductor (L3) 214 and/or current may flow through a primary winding of the fourth inductor (L4) 216 to a load connected to an output of the second phase cell 202. Depending on the phase, one of the currents may be from either an input source at the primary side of the transformer (e.g., during a first phase) or from stored energy of a primary side capacitor component (e.g., a capacitor (C3) and/or a capacitor (C4)) at the primary side of the transformer (during a second phase), while the other current may be an induced current due to the third inductor (L3) 214 and the fourth inductor (L4) 216 being electrically coupled together.

The apparatus 200 comprises a third phase cell 204. The third phase cell 204 comprises a fifth inductor (L5) 222 and a sixth inductor (L6) 224. A secondary winding of the fifth inductor (L5) 222 and a secondary winding of the sixth inductor (L6) 224 are electrically coupled 226 together. The third phase cell 204 and the second phase cell 202 may be electrically coupled 220 together. In particular, the secondary winding of the fourth inductor (L4) 216 of the second phase cell 202 is electrically coupled 220 to the secondary winding of the fifth inductor (L5) 222 of the third phase cell 204.

During one or more phases of energy transfer from a primary side of a transformer of the third phase cell 204 to a secondary side of the transformer of the third phase cell 204, current may flow through a primary winding of the fifth inductor (L5) 222 and/or current may flow through a primary winding of the sixth inductor (L6) 224 to a load connected to an output of the third phase cell 204. Depending on the phase, one of the currents may be from either an input source at the primary side of the transformer (e.g., during a first phase) or from stored energy of a primary side capacitor component (e.g., a capacitor (C5) and/or a capacitor (C6)) at the primary side of the transformer (e.g., during a second phase), while the other current may be an induced current due to the fifth inductor (L5) 222 and the sixth inductor (L6) 224 being electrically coupled together.

In some embodiments, the third phase cell 204 may be connected to one or more additional phase cells. In some embodiments, the third phase cell 204 is electrically coupled 228 to an LC terminating inductor 230, as illustrated by FIG. 2. In particular, the secondary winding of the sixth inductor (L6) 224 is electrically coupled 228 to the LC terminating inductor 230. The LC terminating inductor 230 may be connected to ground 232.

Figure 3:
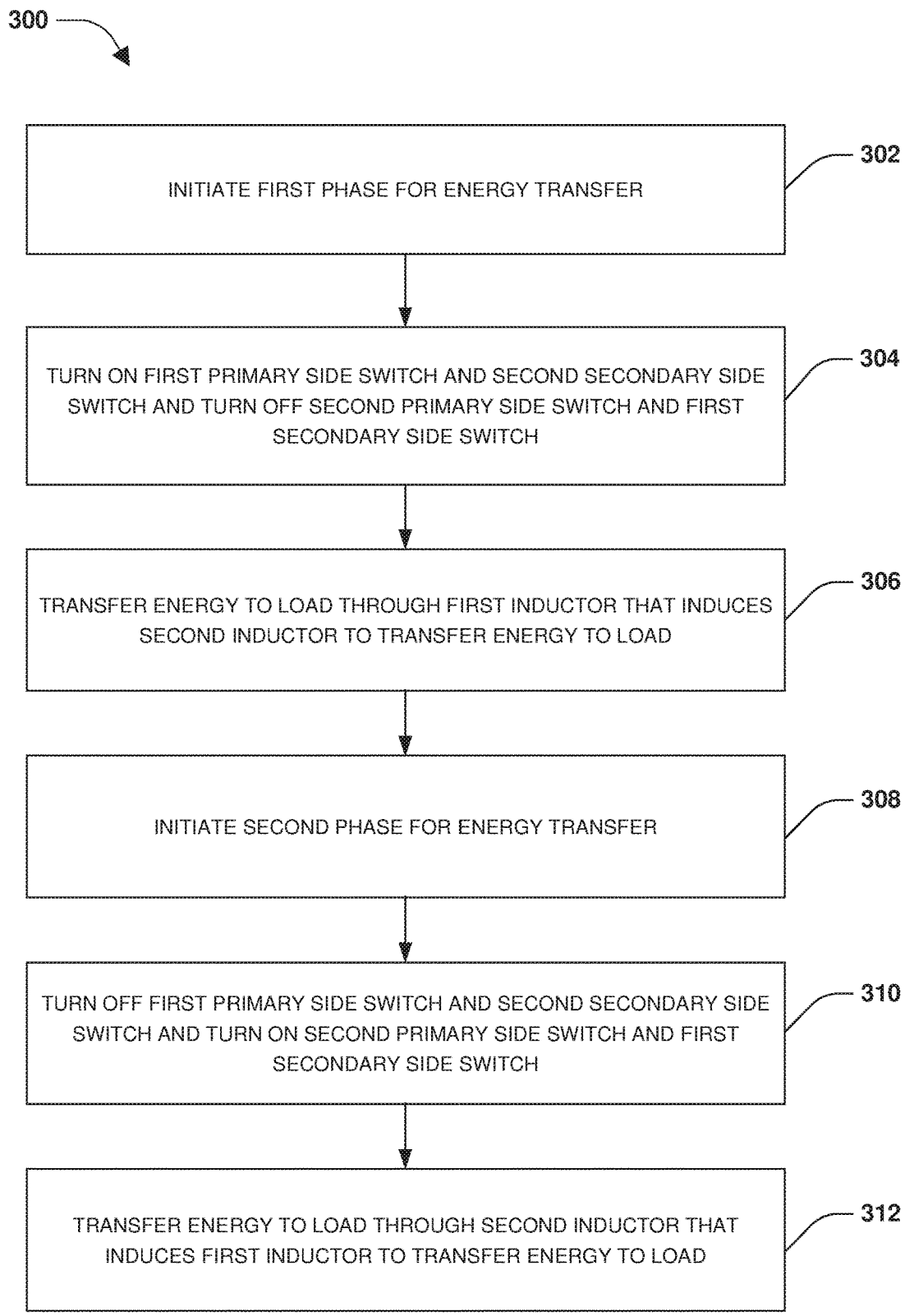
FIG. 3 is an illustration of an example method for controlling an apparatus having a transformer based step down topology in accordance with at least some of the techniques presented herein.

FIG. 3 is an illustration of an example method 300 for controlling an apparatus (e.g., apparatus 100 of FIGS. 1A-1C) having a transformer based step down topology in accordance with at least some of the techniques presented herein. For illustrative purposes, the method 300 is described in conjunction with the apparatus 100 of FIGS. 1A-1C. However, the method 300 can be applied to other apparatus configurations. This two phase embodiment can be extended to higher multi-phase systems by connecting additional secondary side inductors in series, thus electrically coupling higher phase count systems to further increase a current slew rate of these systems.

During operation 302 of the method 300, a first phase of energy transfer from the primary side 101 of the transformer 114 to a secondary side 103 of the transformer 114 is initiated for driving a load at the secondary side 103 of the transformer 114. As part of the first phase of energy transfer, a first primary side switch (e.g., switch (S1) 106) and a second secondary side switch (e.g., switch (S3) 120) are turned on (e.g., as illustrated by FIG. 1B), during operation 304 of the method 300. As part of operation 304 of the method 300, a second primary side switch (e.g., switch (S2) 108) and a first secondary side switch (e.g., switch (S4) 122) are turned off (e.g., as illustrated by FIG. 1B).

As part of the first phase of energy transfer, energy is transferred through a first inductor (e.g., first inductor (L1) 128) of the secondary side 103 of the transformer 114 to the load, during operation 306 of the method 300. The first inductor induces a second inductor (e.g., second inductor (L2) 135) of the secondary side 103 of the transformer 114 to transfer energy to the load based upon an electrical coupling between the first inductor and the second inductor. In some embodiments, the first inductor induces the second inductor to transfer the energy even though the second inductor may be off. During the first phase, a primary side capacitor component (e.g., first capacitor (C1) 110 and/or second capacitor (C2) 112) at the primary side 101 of the transformer 114 is charged.

During operation 308 of the method 300, a second phase of energy transfer from the primary side 101 of the transformer 114 to the secondary side 103 of the transformer 114 is initiated for driving the load at the secondary side 103 of the transformer 114. As part of the second phase of energy transfer, the first primary side switch (e.g., switch (S1) 106) and the second secondary side switch (e.g., switch (S3) 120) are turned off (e.g., as illustrated by FIG. 1C), during operation 310 of the method 300. As part of operation 310 of the method 300, the second primary side switch (e.g., switch (S2) 108) and the first secondary side switch (e.g., switch (S4) 122) are turned on (e.g., as illustrated by FIG. 1C).

As part of the second phase of energy transfer, energy is transferred through the second inductor (e.g., second inductor (L2) 135) of the secondary side 103 of the transformer 114 to the load, during operation 312 of the method 300. The second inductor induces the first inductor (e.g., first inductor (L1) 128) of the secondary side 103 of the transformer 114 to transfer energy to the load based upon the electrical coupling between the first inductor and the second inductor. In some embodiments, the second inductor induces the first inductor to transfer the energy even though the first inductor may be off. During the second phase, stored energy from the primary side capacitor component (e.g., first capacitor (C1) 110 and/or second capacitor (C2) 112) at the primary side 101 of the transformer 114 is transferred through the transformer to the secondary side of the transformer 114. The stored energy from the primary side capacitor component is supplied to the second inductor, and is used by the second inductor to transfer the energy to the load and/or to induce the first inductor to transfer energy towards the load.

As part of transferring energy to the load, a duty cycle may be modified based upon various factors. In some embodiments, a load transient of the load may be detected. In response to detecting the load transient, the duty cycle is increased for transferring the energy to the load. In this way, the duty cycle may be modified based upon load transients.

Figure 4:
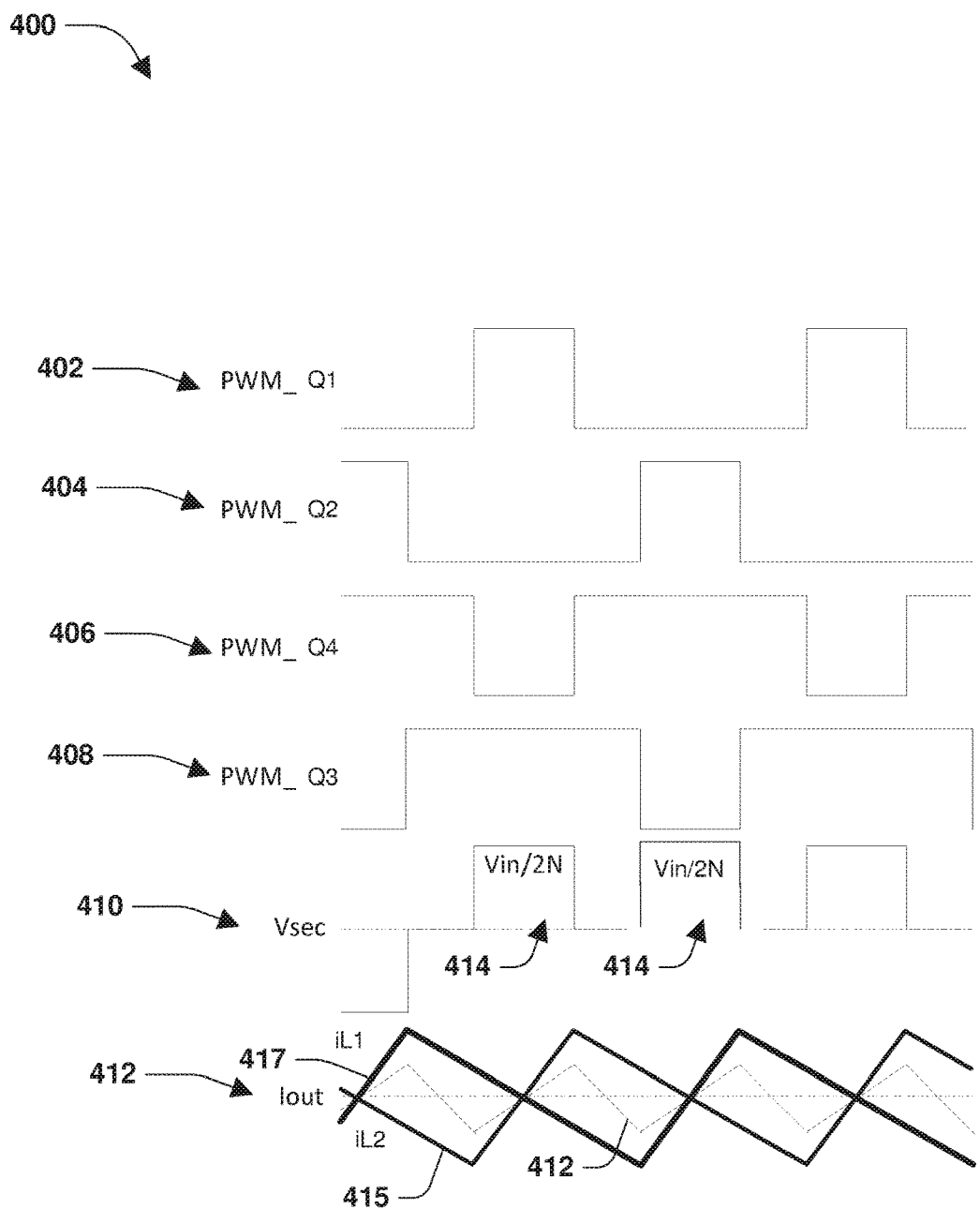
FIG. 4 is an illustration of a timing diagram associated with operation of an apparatus configured according to a transformer based step down topology in accordance with at least some of the techniques presented herein.

FIG. 4 is an illustration of a timing diagram 400 associated with the operation of an apparatus configured according to a transformer based step down topology. The timing diagram 400 illustrates a PWM_Q1 signal 402 from a first pulse width modulator used to control the first switch (S1) 106 of the apparatus 100 or a different switch. The timing diagram 400 illustrates a PWM_Q2 signal 404 from a second pulse width modulator used to control the second switch (S2) 108 of the apparatus 100 or a different switch. The timing diagram 400 illustrates a PWM_Q4 signal 406 from a fourth pulse width modulator used to control the fourth switch (S4) 122 of the apparatus 100 or a different switch. The timing diagram 400 illustrates a PWM_Q3 signal 408 from a third pulse width modulator used to control the third switch (S3) 120 of the apparatus 100 or a different switch. The timing diagram 400 illustrates a secondary side voltage 410 that goes high 414 with a voltage of Vin/2N where Vin is an input voltage of the apparatus 100 and N is a windings ratio of the transformer 114. The timing diagram 400 illustrates an output current (Iout) 412 associated with a current iL1 417 through the first inductor (L1) 128 and/or a current iL2 415 through the second inductor (L2) 135.

During a first phase of energy transfer through the apparatus 100, the PWM_Q1 signal 402 and the PWM_Q3 signal 408 turn the first switch (S1) 106 and the third switch (S3) 120 on, and the PWM_Q2 signal 404 and the PWM_Q4 signal 406 turn the second switch (S2) 108 and the fourth switch (S4) 122 off. The output current (Iout) 412 will rise on/from the current iL1 417 at a rate determined by an inductance of the first inductor (L1) 128. The longer that the PWM_Q1 signal 402 keeps the first switch (S1) 106 on, the large the output current (Iout) 412.

During the second phase of energy transfer through the apparatus 100, the PWM_Q1 signal 402 and the PWM_Q3 signal 408 turn the first switch (S1) 106 and the third switch (S3) 120 off, and the PWM_Q2 signal 404 and the PWM_Q4 signal 406 turn the second switch (S2) 108 and the fourth switch (S4) 122 on. The current iL2 415 through the second inductor (L2) 135 towards the load will rise. During an off time while the PWM_Q1 signal 402 is low, the PWM_Q4 signal 406 is turned on.

An embodiment of the presently disclosed techniques includes an apparatus configured according to a transformer based step down topology. The apparatus includes a first transformer configured to transfer energy of an input source from a primary side of the first transformer to a secondary side of the first transformer for driving a load at the secondary side; a first inductor and a second inductor electrically coupled at the secondary side; and a primary side directional conducting element and a secondary side directional conducting element configured to perform a first phase of transferring the energy through the first inductor and a second phase of transferring the energy through the second inductor, wherein the first inductor induces the second inductor to transfer energy during the first phase and the second inductor induces the first inductor to transfer energy during the second phase.

According to some embodiments, the primary side directional conducting element includes a first switch and a second switch located at the primary side of the first transformer.

According to some embodiments, the first switch is turned on and the second switch is turned off during the first phase to cause current flow from the input source through the first switch to the first transformer.

According to some embodiments, the first switch is turned off and the second switch is turned on during the second phase to cause current flow from a capacitor at the primary side to the first transformer and through the second switch to ground.

According to some embodiments, the secondary side directional conducting element includes a first switch and a second switch located at the secondary side of the first transformer.

According to some embodiments, the first switch is turned off and the second switch is turned on during the first phase to cause current flow through the first inductor.

According to some embodiments, the first switch is turned on and the second switch is turned off during the second phase to cause current flow through the second inductor.

According to some embodiments, the apparatus includes at least one of an LC terminating inductor connected to the second inductor or an LC component corresponding to an embedded and distributed leakage inductance of an output transformer and traces of the apparatus.

According to some embodiments, the apparatus includes a primary side capacitor component connected to the first transformer, wherein energy from the primary side capacitor component is transferred through the first transformer to the secondary side during the second phase.

According to some embodiments, the primary side capacitor component is charged during the first phase.

According to some embodiments, the apparatus includes a controller configured to trigger a duty cycle increase for transferring the energy through the first transformer to the load based upon a detected load transient.

According to some embodiments, the first transformer, the first inductor, the second inductor, the primary side directional conducting element, and the secondary side directional conducting element are part of a first phase cell, and wherein the apparatus includes a second phase cell having a second transformer, a third inductor connected to the second inductor, and a fourth inductor connected to the third inductor.

According to some embodiments, apparatus is configured according to a forward convert configuration, a half bridge configuration, or a full bridge configuration.

According to some embodiments, the apparatus includes a primary side capacitor connected to the input source; and a secondary side capacitor connected to the load.

An embodiment of the presently disclosed techniques includes a method of operating an apparatus having a first transformer based step down topology. The method includes initiating a first phase for transferring energy from a primary side of a transformer to a secondary side of the transformer for driving a load at the secondary side by turning on a first primary side switch and a second secondary side switch and turning off a second primary side switch and a first secondary side switch, wherein the energy is transferred through a first inductor of the secondary side to the load, and wherein the first inductor induces a second inductor of the secondary side to transfer the energy during the first phase based upon an electrical coupling between the first inductor and the second inductor; and initiating a second phase for transferring the energy by turning off the first primary side switch and the second secondary side switch and turning on the second primary side switch and the first secondary side switch, wherein the energy is transferred through the second inductor to the load, and wherein the second inductor induces the first inductor to transfer the energy during the second phase based upon the electrical coupling.

According to some embodiments, the method includes in response to detecting a load transient associated with the load, increasing a duty cycle for transferring the energy to the load.

According to some embodiments, during the second phase, the energy is transferred from a primary side capacitor component through the transformer to the secondary side.

According to some embodiments, the method includes charging the primary side capacitor component during the first phase.

An embodiment of the presently disclosed techniques includes an apparatus configured according to a transformer based step down topology. The apparatus includes a plurality of phase cells including a first phase cell having: a first transformer configured to transfer energy from a primary side of the first transformer to a secondary side of the first transformer for driving a load at the secondary side; a first inductor and a second inductor electrically coupled at the secondary side; and a primary side directional conducting element and a secondary side directional conducting element configured to perform a first phase of transferring the energy through the first inductor and a second phase of transferring the energy through the second inductor, wherein the first inductor induces the second inductor to transfer energy during the first phase and the second inductor induces the first inductor to transfer energy during the second phase; and a second phase cell having a second transformer, a third inductor connected to the second inductor, and a fourth inductor connected to the third inductor.

According to some embodiments, the apparatus includes at least one of an LC terminating inductor connected to the fourth inductor or an LC component corresponding to an embedded and distributed leakage inductance of an output transformer and traces of the apparatus.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An apparatus configured according to a transformer based step down topology, comprising:
    a first transformer configured to transfer energy of an input source from a primary side of the first transformer to a secondary side of the first transformer for driving a load at the secondary side;
    a first inductor and a second inductor electrically coupled at the secondary side;
    an inductor connected between the second inductor and a ground; and
    a primary side directional conducting element and a secondary side directional conducting element configured to perform a first phase of transferring the energy through the first inductor and a second phase of transferring the energy through the second inductor, wherein the first inductor induces the second inductor to transfer energy during the first phase and the second inductor induces the first inductor to transfer energy during the second phase.

2. The apparatus of claim 1, wherein the primary side directional conducting element comprises a first switch and a second switch located at the primary side of the first transformer.

3. The apparatus of claim 2, wherein the first switch is turned on and the second switch is turned off during the first phase to cause current flow from the input source through the first switch to the first transformer.

4. The apparatus of claim 2, wherein the first switch is turned off and the second switch is turned on during the second phase to cause current flow from a capacitor at the primary side to the first transformer and through the second switch to the ground.

5. The apparatus of claim 1, wherein the secondary side directional conducting element comprises a third switch and a forth switch located at the secondary side of the first transformer.

6. The apparatus of claim 5, wherein the third switch is turned off and the forth switch is turned on during the first phase to cause current flow through the first inductor.

7. The apparatus of claim 5, wherein the third switch is turned on and the forth switch is turned off during the second phase to cause current flow through the second inductor.

8. The apparatus of claim 1, comprising:
    a component corresponding to an embedded and distributed leakage inductance of an output transformer and traces of the apparatus.

9. The apparatus of claim 1, comprising:
    a primary side capacitor component connected to the first transformer, wherein energy from the primary side capacitor component is transferred through the first transformer to the secondary side during the second phase.

10. The apparatus of claim 9, wherein the primary side capacitor component is charged during the first phase.

11. The apparatus of claim 1, comprising:
a controller configured to trigger a duty cycle increase for transferring the energy through the first transformer to the load based upon a detected load transient.

12. The apparatus of claim 1, comprising:
a primary side capacitor connected to the input source.

13. The apparatus of claim 1, wherein the apparatus is configured according to a forward convert configuration, a half bridge configuration, or a full bridge configuration.

14. The apparatus of claim 1, comprising
a primary side capacitor connected to the input source; and
a secondary side capacitor connected to the load.

15. A method of operating an apparatus having a transformer based step down topology, comprising:
initiating a first phase for transferring energy from a primary side of a transformer to a secondary side of the transformer for driving a load at the secondary side by turning on a first primary side switch and a second secondary side switch and turning off a second primary side switch and a first secondary side switch, wherein the energy is transferred through a first inductor of the secondary side to the load, and wherein the first inductor induces a second inductor of the secondary side to transfer the energy during the first phase based upon an electrical coupling between the first inductor and the second inductor, wherein the apparatus comprises an inductor connected between the second inductor and a ground; and
initiating a second phase for transferring the energy by turning off the first primary side switch and the second secondary side switch and turning on the second primary side switch and the first secondary side switch, wherein the energy is transferred through the second inductor to the load, and wherein the second inductor induces the first inductor to transfer the energy during the second phase based upon the electrical coupling.

16. The method of claim 15, comprising:
in response to detecting a load transient associated with the load, increasing a duty cycle for transferring the energy to the load.

17. The method of claim 15, wherein during the second phase, energy is transferred from a primary side capacitor component through the transformer to the secondary side.

18. The method of claim 17, comprising:
charging the primary side capacitor component during the first phase.

19. An apparatus configured according to a transformer based step down topology including:
a first phase cell comprising:
a first transformer configured to transfer energy from a primary side of the first transformer to a secondary side of the first transformer for driving a load at the secondary side;
a first inductor and a second inductor electrically coupled at the secondary side;
an inductor connected between the second inductor and a ground; and
a primary side directional conducting element and a secondary side directional conducting element configured to perform a first phase of transferring the energy through the first inductor and a second phase of transferring the energy through the second inductor, wherein the first inductor induces the second inductor to transfer energy during the first phase and the second inductor induces the first inductor to transfer energy during the second phase.

20. The apparatus of claim 19, comprising:
a component corresponding to an embedded and distributed leakage inductance of an output transformer and traces of the apparatus.

* * * * *